(12) United States Patent
Meriac

(10) Patent No.: US 10,917,243 B2
(45) Date of Patent: Feb. 9, 2021

(54) SECURE SERVER AND COMPUTE NODES

(71) Applicant: Arm IP Limited, Cambridge (GB)

(72) Inventor: Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 214 days.

(21) Appl. No.: 16/025,142

(22) Filed: Jul. 2, 2018

(65) Prior Publication Data

US 2019/0007216 A1  Jan. 3, 2019

(30) Foreign Application Priority Data

Jul. 3, 2017 (GB) .................................. 1710666.7

(51) Int. Cl.

| | |
|---|---|
| *H04L 9/32* | (2006.01) |
| *H04L 9/30* | (2006.01) |
| *G06F 21/57* | (2013.01) |
| *G06F 21/53* | (2013.01) |
| *H04L 29/06* | (2006.01) |
| *H04L 29/08* | (2006.01) |

(52) U.S. Cl.
CPC ............ *H04L 9/3247* (2013.01); *G06F 21/53* (2013.01); *G06F 21/572* (2013.01); *G06F 21/575* (2013.01); *H04L 9/30* (2013.01); *H04L 9/3263* (2013.01); *H04L 9/3268* (2013.01); *H04L 63/0407* (2013.01); *G06F 2221/033* (2013.01); *H04L 67/10* (2013.01)

(58) Field of Classification Search
CPC . H04L 9/3247; H04L 63/0407; H04L 9/3268; H04L 9/3263; H04L 9/30; H04L 67/10; G06F 21/53; G06F 21/575; G06F 21/572; G06F 2221/033; G06F 9/4406; G06F 21/44

See application file for complete search history.

(56) References Cited

U.S. PATENT DOCUMENTS

| | | | |
|---|---|---|---|
| 10,068,068 B2* | 9/2018 | Narendra Trivedi | ........................ G06F 21/126 |
| 10,581,617 B2* | 3/2020 | Khosravi | ............... H04L 63/068 |
| 10,592,670 B2* | 3/2020 | Poornachandran | ... G06F 21/575 |
| 2013/0067568 A1 | 3/2013 | Obasanjo et al. | |
| 2015/0101032 A1 | 4/2015 | Shimakawa | |
| 2018/0211054 A1* | 7/2018 | Costa | ...................... G06F 21/64 |
| 2019/0278913 A1* | 9/2019 | Ndu | ........................ G06F 21/51 |

FOREIGN PATENT DOCUMENTS

WO  2016144354 A1  9/2016

* cited by examiner

*Primary Examiner* — Christopher A Revak
(74) *Attorney, Agent, or Firm* — Leveque Intellectual Property Law, P.C.

(57) ABSTRACT

Apparatus and methods are described to provision a compute node in a plurality of compute nodes to a requestor, comprising receiving an anonymised access token from a provider of the compute nodes, requesting identities of a subset of compute nodes in the plurality of compute nodes, selecting at least one compute node in the subset of compute notes, providing the anonymised access token to a secure enclave of the selected at least one compute node, providing an anonymised identity of the requestor to the secure enclave and validating use of the anonymised identity with the access token.

20 Claims, 4 Drawing Sheets

SECURE SERVER AND COMPUTE NODES

RELATED APPLICATIONS

This patent application claims priority to GB patent application 1710666.7 filed on Jul. 3, 2017, the entire content of which is hereby incorporated by reference.

FIELD OF THE DISCLOSURE

Apparatus and methods for protecting data on cloud based servers, and the provisioning thereof to users are described.

DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
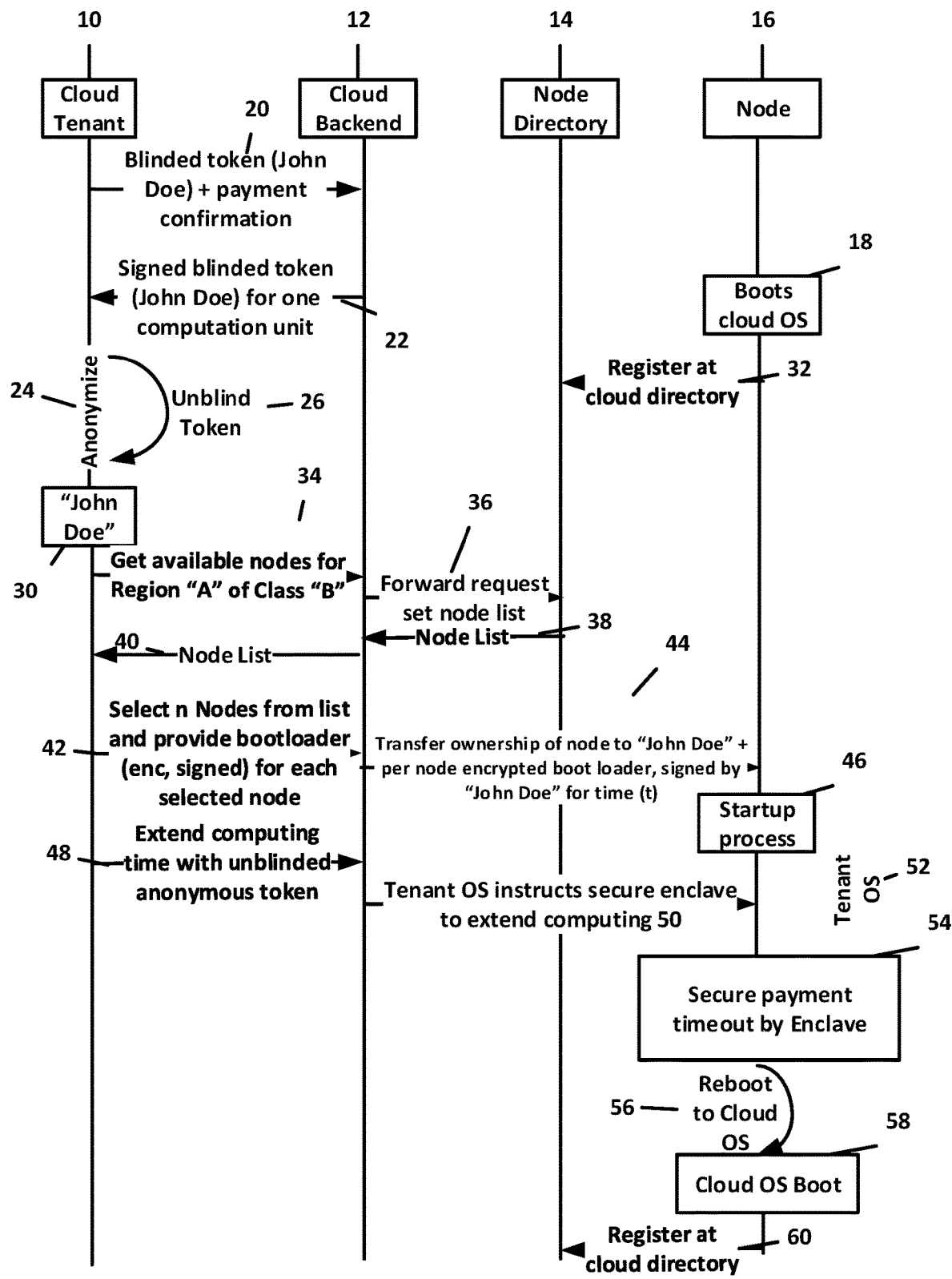
FIG. 1 shows the process of provisioning.

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may also be combined to provide other embodiments.

According to a first aspect there is a provided a method of provisioning a compute node in a plurality of compute nodes to a requestor, the method comprising receiving an anonymised access token from a provider of the compute nodes, requesting identities of a subset of compute nodes in the plurality of compute nodes, selecting at least one compute node in the subset of compute nodes, providing the anonymised access token to a secure enclave of the selected at least one compute node, providing an anonymised identity of the requestor to the secure enclave and validating use of the anonymised identity with the access token.

According to a second aspect of the disclosure there is provided an apparatus for accessing compute resource on a plurality of compute nodes, wherein the apparatus comprises a processing element configured to: receive an anonymised access token from a provider of the compute nodes; request identities of a subset of compute nodes in the plurality of compute nodes to provide the compute resource; select at least one compute node in the subset of compute nodes; provide the anonymised access token to a secure enclave of the selected at least one compute node; provide an anonymised identity of the requestor to the secure enclave; and responsive to validation of the anonymised identity with the access token, access compute resource on the selected at least one compute node.

This disclosure illustrates an approach for developing contemporary public cloud solutions into services for processing confidential computing tasks—while balancing the requirement to make the cloud computing hardware commercially competitive. Features and techniques described herein are beneficial for sensitive public applications, including, but not limited to financing data processing and the processing of medical data.

Described herein are techniques for hiding information in plain sight from potential adversaries by unpredictably mixing computing tasks and node communication over a large public cloud infrastructure of (hardened) server nodes and therefore makes it particularly hard for an adversary or the compute provide themselves to understand what computing tasks are running on which computing nodes; from including determining ownership of content, compute nodes, content or state of running computing tasks or the logical architecture of the customer application.

The system described herein trades power consumption, response time and network bandwidth for privacy and integrity of critical computing tasks in the public cloud—while less sensitive task benefit from application level shielding of processing tasks and non-repudiation features and application protocol level logging enabled by a trusted hypervisor over compartmentalized hypervisor target domains.

To hide ownership of tasks a mixture of solutions may be used to anonymize the consumption of cloud services: from preventing fingerprinting of network communication patterns with the malicious intent to identify/profile specific customer tasks, whitening of computations on nodes and migration of tasks during computation between nodes in unpredictable patterns to evade local attackers.

The security of individual computing nodes is increased by using a combination of traditional methods including encryption and strong integrity checks of memories like external SDRAM and hard disk volumes. Contrary to existing solutions which commonly depend on a chain of trust of pre-installed 3rd party software images (BIOS, various hypervisor-based virtualization technologies etc.) described herein is a bootstrapping method to reduce the computing nodes attack surface to a secure chip enclave. The secure chip enclave has limited reach into the system and a well-defined communication interface to the main CPU and remote users.

In illustrated embodiments the secure chip enclave requires an implementation complexity comparable to medium-range smart card applications. It doesn't require networking features; its communication may be 'outsourced' to a potentially untrusted operating system and it can be further used to answer queries on system-level trust states like disabled management interfaces and tamper-detection signals in a trusted way.

The secure chip enclave in combination with a cryptographic per-chip identity may be used to provision trusted boot loaders anonymously and securely by temporary tenants of the cloud computing node. The secure chip enclave is also responsible for switching the computation node ownership temporarily and provably between trusted and untrusted software stacks.

The presented methods increase the cost of attacks to a point where feasibility and risk of discovery of the attack discourages potential attackers. Insider attacks and bugs are mitigated by introducing a capability-based security model for inter-node network communication.

In the illustrated system computing nodes have baseline security features like Secure Memory Encryption (SME), Secure Encrypted Virtualization (SEV) or similar. The keys for RAM and nonvolatile memory encryption (harddisk etc.) may be managed within the SoC to prevent cold-boot attacks. Countermeasures for detecting tampering may also be in place (chip-level anti-tampering sensors, secure clocks sources & filtering, glitch-detection, power- and temperature monitoring etc.).

Encryption and integrity checks of external memories alone are typically insufficient to prevent low cost class attacks against cloud infrastructure nodes—a wide range of class attacks is enabled by running untrusted code in parallel to trusted code or by inferring internal activity through observation of external communication and active probing of network interfaces. To prevent these types of attacks, tenants of cloud nodes tightly control all software running on the device without destroying the portability of general purpose operating systems.

Any BIOS initialization code required for portability runs with least privileges (no network access—enforced by the hypervisor, disabled during sensible computations—re-enabled only after flushing caches etc.)

The secure chip enclave is provided as the active root of trust for compute nodes and subsequently for enabling a trusted cloud infrastructure as described herein.

For protecting the system against faulty code and insider attacks, a security enabled hypervisor restricts access to IOMMU's, forces protection of memories and disables access to peripherals suitable for exfiltrating data.

Direct access to network interfaces may be prevented by the hypervisor such that code instead presents capability certificates created by the node group tenant for connecting to certain node identities or external services. All external access is subject to application-level firewalling enforced by the hypervisor. Security domains with exposure to external protocol and with the feature of application level firewalling can be supported by capability-based system processor architectural techniques such as CHERI. By checking and logging the outbound communication of security domains, a trusted logical "air-gapping" with arbitrary complex rules can be implemented reliably—allowing to run legacy application in security domains that are shielded by these formally verified high security domains.

The security gating software for inspecting inbound—and outbound traffic policies as enforced by the hypervisor is running in low-privilege domains of the cloud-node-tenant-provided hypervisor—the hypervisor itself can be very light and formally verified. MirageOS is one example for implementing firewall security-domains on ARM® systems.

For critical tasks network traffic may be temporally suspended by the hypervisor if needed.

The tenant provided hypervisor extends naturally the trust level introduced by the secure chip enclave. After the tenancy of the cloud user expires, the node may automatically revert to the untrusted cloud provider software stack by forcing the system through a cold boot. All keys used in the previous session expire—ensuring temporal isolation between cloud provider software and the tenant's software stack.

Initially the cloud node (compute node) is booted using the cloud provider's operating system—untrusted by the future cloud tenant (requestor). The cloud provider's OS registers with the provider's backend and announces its hardware capabilities to the provider's backend.

Figure 3:
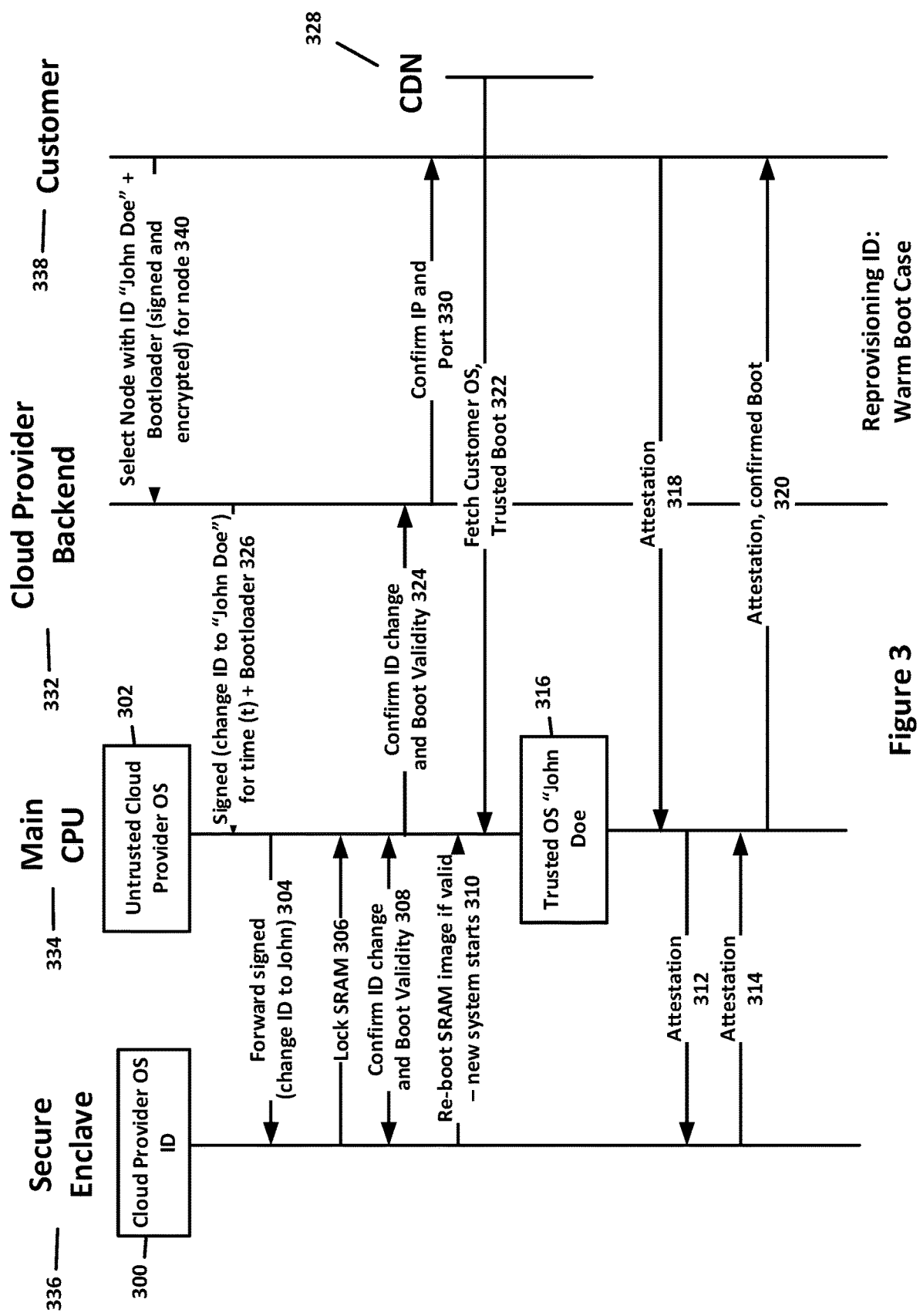
FIG. 3 shows the process of switching between a cloud provider operating system and a requestor/tenant operating system.

Described in more detail below, the cloud tenant's OS is temporally shielded from the untrusted cloud provider OS in a remotely verifiable way (secure boot chain and remote attestation). The cloud node provisioning flow temporally keeps the untrusted cloud provider OS separated from the tenant's trusted OS. FIG. 3 illustrates how the switch from one OS to the other takes place.

Using the untrusted OS's communication stack, a remote tenant may register for a specific computing node—attesting the remote nodes integrity and identity by querying the trusted secure chip enclave. The untrusted OS can then place an encrypted and signed 1st stage boot loader or hypervisor into a shared internal memory—and the secure chip enclave can perform decryption and security verification of the boot loader while halting the main CPU.

Further details of embodiments are set out below.

An attack by a hacker on a server system having many compute nodes typically creates a certain cost for the attacker. By hiding one or more targeted operations/activities/data items of interest in a larger group of operations of one or more users/set of operations/activities/data, the costs of attacks on specific targets may increase beyond the value of the information extracted by the specific attack.

The present description describes techniques for addressing such challenges and the subsequent challenges introduced through providing such protective mechanisms, including, for example embodiments in which a cloud customer may pick a random set of compute nodes in a server system out of a large sample set to make it more difficult for a targeted attached on that user's activities or data.

One issue that may arise because of anonymising or randomising the selection of compute nodes is that tracking activity to enable accurate charging by the cloud provider becomes challenging. Information needs to be processed and charged by the cloud service provider to the appropriate user for use of the compute nodes, which may be problematic with any form of randomisation or anonymization which provides privacy to the user. Techniques are described to address this using anonymised digital currencies. In some embodiments, for example, the payment/digital currency may be a blind-signed public-key token representative of one computation units (e.g. of between 100 ms or 1 h) or more complex currencies that allow splitting of transactions or even smart contracts.

Example System

Figure 2:
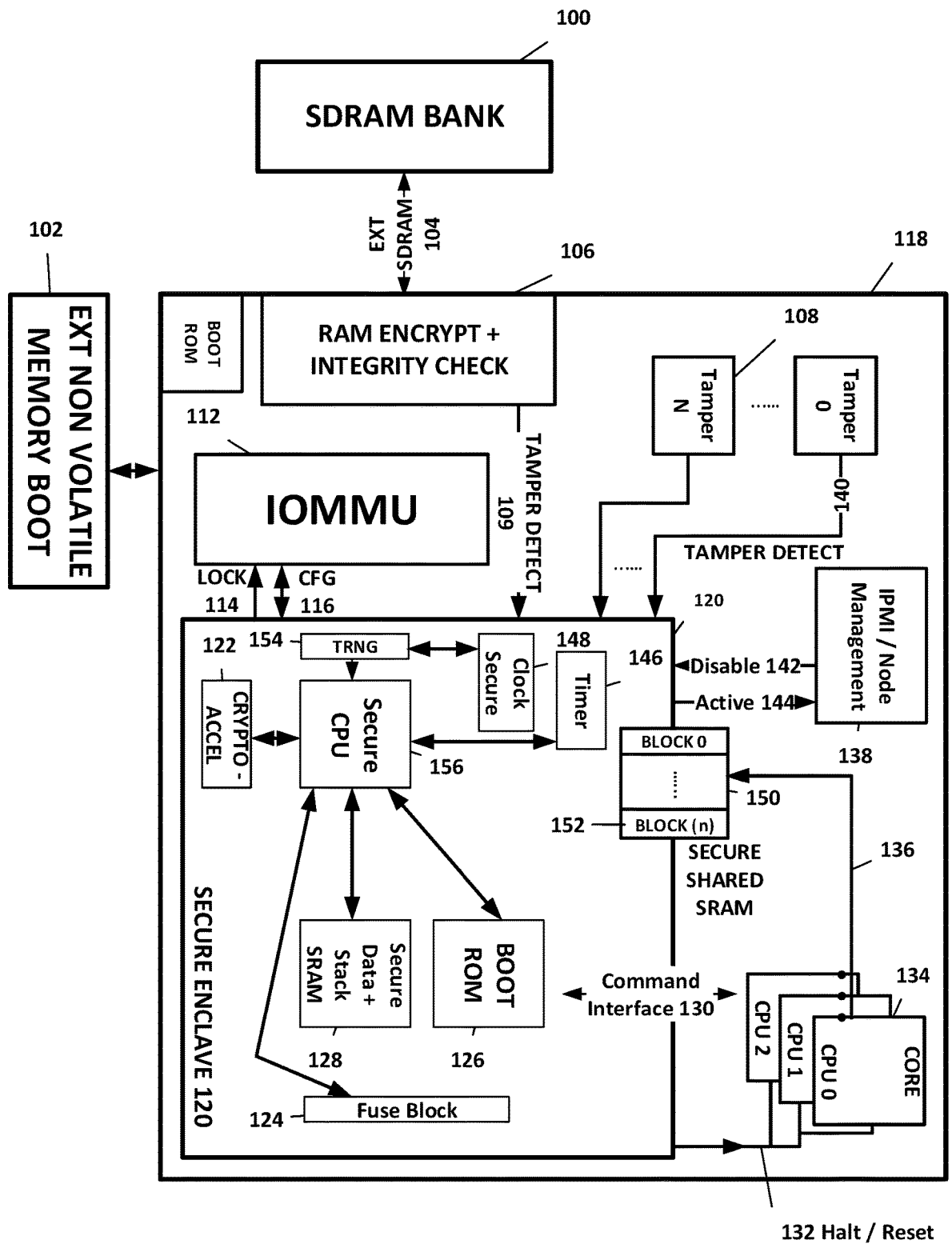
FIG. 2 shows a system architecture including a secure enclave.

In embodiments, a cloud server platform (having many compute nodes) may comprise the following components, further details of which are illustrated in FIG. 2:

Compute nodes with an untrusted software stack provided by the cloud provider running on one or more processing elements, processing elements (e.g. CPUs) nodes optionally with capabilities to harden the processing element against external active attacks such as glitching. In the event of detection of an attack, in embodiments shared memory (e.g. SRAM) and enclave memory (e.g. a shared SRAM between the secure enclave and the main CPU) are read/write-protected as soon as possible and may then be wiped by hardware state machines or similar means, a secure enclave, and shared memory between a processing node/element in the cloud server platform and the secure enclave.

A secure enclave may be created by a dedicated privilege level of the main CPU higher than user-provisioned code or by a dedicated CPU core located on the same silicon die for example.

Some embodiments may implement the secure chip enclaves using privilege levels above remotely provisioned code, however in other embodiments, such as those described further herein may instead use a dedicated secure CPU on the same silicon die as the main CPUs of the cloud computing node. The configuration variant with a dedicated CPU may be preferable (although not essential) compared to splitting the main CPU into a secure world and a non-secure world for remotely provisioned code. The dedicated CPU may then simplify protection against side channel attacks by the main CPU and enables sophisticated and pin-pointed anti-tamper silicon-level protection-features of peripherals and memories used by the secure enclave in a portable way without changing the main CPU design.

Usage of per-chip secure identities in the secure enclave for remotely attesting the state and security level of the system and main CPU may be required to establish a secure management link between the remote cloud node tenant and the secure enclave—this is possible even through an untrusted cloud provider OS with an untrusted communication stack.

By sharing a hardened and tamper-protected SRAM between the main CPU and the secure enclave, the secure chip enclave may verify and decrypt remotely provisioned boot code and secrets and orchestrate a trusted boot into the remotely provided tenant code after positive verification.

It will be appreciated that the secure chip enclave may still be subject to third-party security review and random inspection of the finished chip product to provide for increased level of trust. To prevent counterfeit CPUs the individual secure attestation identities may be used. The full certificates for proving that the devices are genuinely built by the silicon vendor can be either read offline from the system BIOS or obtained from a directory service (no trust required to the directory).

In the case of the dedicated privilege level forming the secure enclave, the term 'main cpu' may refer to the lower privileged mode. In case of a dedicated CPU core for the secure enclave, the term 'main cpu' may refer to a dedicated computation unit optimized for executing user-provisioned code (rather than being optimized for security and tamper-resistance like the dedicated CPU of the secure chip enclave). Such a dedicated CPU core can be of the same architecture or of a different architecture than the main CPU core(s).

In this case of the privileged mode forming the secure enclave, the shared memory (e.g. SRAM) access control is dictated by the current CPU privilege level—(SRAM) memory blocks may have different read/write permissions depending on whether the CPU is in secure enclave mode or whether its executing user code. In this case access privileges may still be configured for each privilege level separately, e.g. by use of a dedicated access permission register.

Using this block-based access protection mechanism, the secure enclave can prevent modifications of the secure hypervisor/boot code, data or stacks by protecting its memories against the untrusted user code. The user code may decide to protect memory blocks against the secure enclave if needed—mainly to store encryption keys in a tamper-proof way (contrary to storing them in external RAM). More details on the block-level protection are described later.

Figure 4:
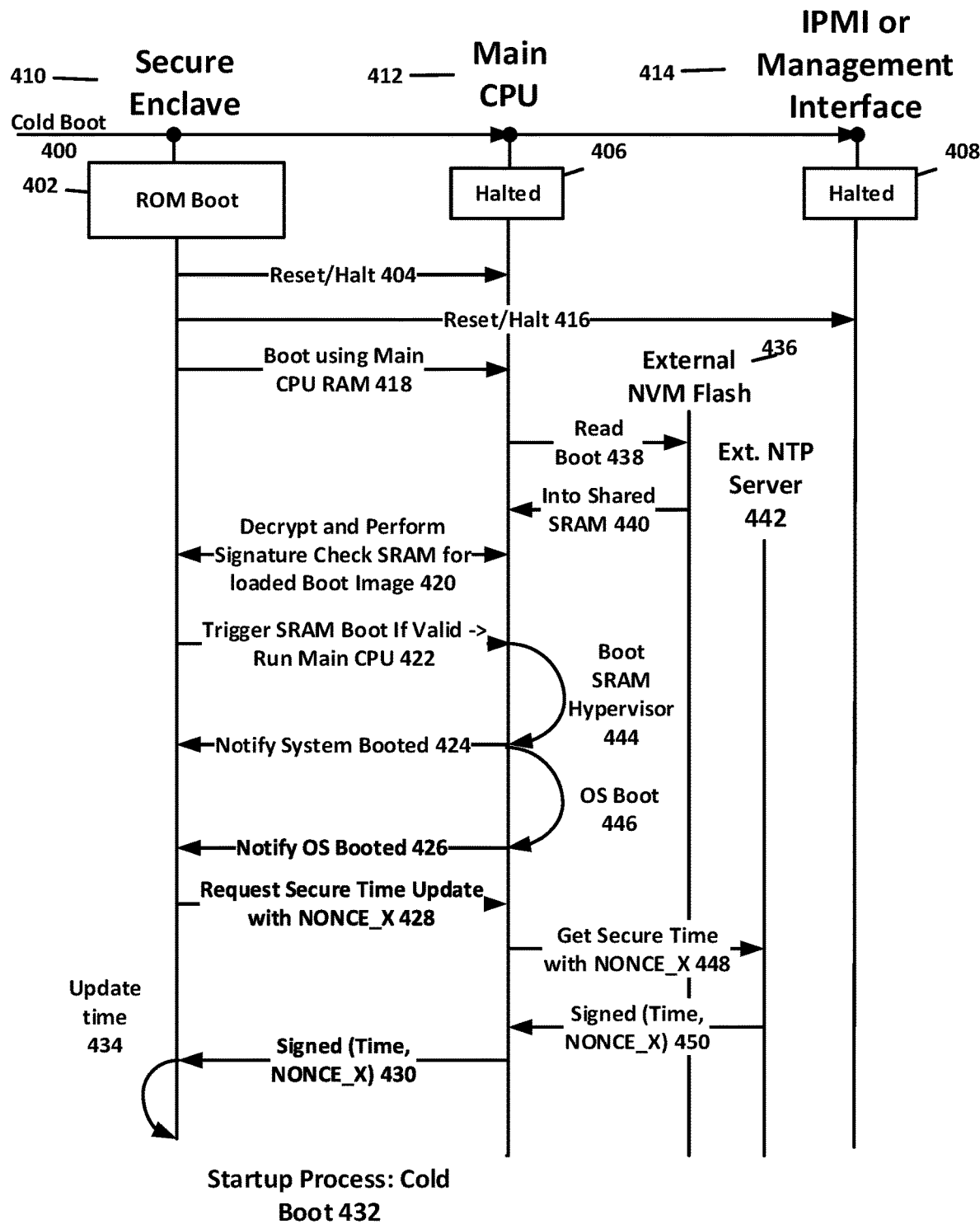
FIG. 4 shows an example boot up procedure.

In case of positive verification, the secure chip enclave may force the main CPU to perform a cold boot into the newly received boot payload as illustrated by way of example in FIG. 4. The time for running the payload exclusively on the cloud computation node would be commonly expressed via a time-bound signature. After expiration of the usage time, the secure enclave may force the node to reboot back into the cloud provider OS to become available again to other customers/requestors. During operation certificates may be used to extend the lease of the cloud node tenant anonymously.

To reconcile the cloud provider's need for accurate billing of cloud resources and the customers need for privacy of tenancy on a cloud node instance, provisioning protocols may use existing anonymous digital currencies. The anonymized payment for these computation services may be a blind-signed public-key token—each representing one computation unit (commonly between 1 h or 100 ms). Alternatively, more complex currencies like ZeroCash, which allow splitting of transactions anonymously can be used.

Cloud customers may be able to pick a random set of nodes out of a large sample set for deploying tasks anonymously and without interference by the cloud provider. By using trusted CPU identities, the lists of node candidates for migrating tasks or nodes are genuine and potential computing task migration targets are not emulated and sensitive cloud customers are able to hide in the public masses.

In such systems, it may also be desirable for the public to have access to these anonymized services, too with the purpose of increasing the general noise to enable hiding of critical services. For law enforcement purposes, the blinded cryptographic identities might be unblinded by key-escrow methodologies outside of the cloud provider's control.

Further details of the secure enclave are set out below:

Preferably the secure enclave is on the CPU die for full security, however in embodiments it may be possible to choose to expand the trust to the CPU housing level (multichip), to a trusted module level (shielded module PCB) or the server mainboard or an external watchdog for example.

the secure enclave may have a fallback to an internal clock source (RC) in case CPU clock drops or diverges from an imprecise internal reference clock by a certain threshold.

the secure enclave may have a tamper-proof custom security module on-die with own its protected SRAM-memory and side-channel-protected crypto accelerator.

the secure enclave may interact with the rest of the CPU via a non-DMA'ed interface or as a DMA-slave.

the secure enclave may be provisioned with a CPU-specific public-key identity, tracking back to the manufacturer or if the public key is not provisioned by the chip manufacturer then created during Chip manufacturing using its own random number generator (e.g. TRNG) and stored in (Anti-)Fuses. The public key of the enclave may be made available to the main CPU core for signing by the manufacturer using a model- & production-run-specific certificate. The signed certificate may also include the serial number of the CPU Workflow.

The full certificate chain for each chip may be made available in an untrusted public network-directory, indexed by chip serial number and maintained by the chip manufacturer. Additionally, the certificate chain may then be stored in an untrusted external NVM memory on the mainboard of the cloud computing CPU and can be part of the untrusted BIOS.

the secure enclave may be able perform a cold boot of the target CPU from shared SRAM the secure enclave may have access to tamper-signals for main CPU cores and external sources the secure enclave may operate such that only the primary CPU core enabled on boot, with the secure enclave able to reset CPU cores individually.

the secure enclave may be able to force boot from external BIOS as a fallback.

the secure enclave may have a private and tamper-proof memory, such as SRAM.

The secure enclave may have control over possible management interfaces of the CPU and may disable these if needed. During boot, possible management interfaces (IPMI etc) may be disabled during early BIOS boot and then enabled after a first-stage boot is done and if permitted by the end customer.

the secure enclave may have an owner public key slot in memory (e.g. SRAM). By default, that slot is free and available on a first-come-first-serve basis. The main CPU can at any point in time provision that initial key to the Secure enclave. While the slot is free, the secure enclave may only accept a minimum set of commands (version, set owner key etc.)

the secure enclave may have one or more fuse-slots for providing the initial owner public key.

Further details/requirements of the shared memory are set out below:

Primary CPU core of main CPUs may have read-write access to shared memory (e.g. SRAM)

Secure enclave CPU may have read-only access to shared memory (e.g. SRAM)

The secure enclave CPU may read and/or write-protect shared memory blocks from main CPU (lock-down) on a block basis (e.g. 64 or more blocks)

Shared memory may preferably be excluded from the CPU cache (ideally 0-ws, or any constant amount of waitstates)

The memory size may typically be between 128 kbyte-1 Mbyte

In the event of tamper detection, tamper signals of the main CPU cores, the secure chip enclave and related on-chip peripherals and off-chip tamper signals (mainboard, server case etc.) may trigger deletion of the content of the shared memory Shared memory may be excluded from external access via DMA (core coupled instead) to prevent external peripherals from modifying or inspecting secrets stored in the memory.

Shared memory content may be deleted via a state-machine process as part of the cold-boot process, before the Secure Enclave CPU is booted.

Shared memory content may be hardened and may be tamper-proof and may incorporate well-established antitamper countermeasures (capacitive meshes, light and temperature sensors etc.)

Both the main CPU and the secure enclave may give up read or write access to individual blocks in the shared memory for their own side until the next cold boot. The access-state for each block can be inspected by both sides. The system may then need to go through a cold boot to gain access to all shared memory sectors.

Using the above described components, one or more compute nodes in a cloud server system/platform may be provisioned to a user using one of the example workflows set out below. It will be appreciated that one or more of the methods set out in the process below may be non-essential.

Some embodiments may comprise cloud nodes with untrusted operating systems provided by the cloud service/server provider. In such a system, the first stage may comprise booting the compute nodes which may comprise one or more of the following actions:

The cloud compute node in the system is powered up if it has been previously powered down to conserve energy.

The main CPU cores may then be halted by default and kept in reset (e.g. asynchronous reset) by the secure chip enclave.

The secure chip enclave may then boot from its own mask ROM

The secure chip enclave may then set the boot mode to external NVM by enabling one CPU core and a mask ROM to boot from (signed by owner key or unsigned for example).

The main CPU mask ROM copies external NVM (System BIOS) content into shared memory.

The main CPU then notifies Secure chip enclave of completion of 1st stage copying process.

The secure chip enclave takes over control by halting main CPUs through cold reset—and holding the reset signal The secure chip enclave may then verify the memory content for a valid boot image using public-key signature verification (it will be appreciated that at this point in time there may be concept of secure time and certificate expiration at this point—and in some embodiment rollback protection counters may be implemented by e.g. (anti-) fuses controlled by the secure chip enclave.

In the event of a successful boot the Secure chip enclave remembers the image hash and certificate in the enclave memory (e.g. SRAM) and triggers a main CPU cold boot from internal memory.

In the event of an invalid signature, the system boot may continue with the Secure chip enclave disabled and the remaining CPU cores activated.

Next, the untrusted cloud provider OS boots.

Using a challenge-response and a random NONCE from the secure enclave the secure enclave requests a secure time update through the untrusted OS ("proof of freshness"). The secure enclave can re-request secure time updates from the secure OS whenever it deems necessary.

The cloud computing node then registers in cloud provider directory as available.

With the boot process complete, the next stage is to provide trusted and anonymous compute node provisioning to a user, which may comprise carrying out one or more of the following actions and as illustrated in FIG. 1:

A customer buys or requests authorisation to access compute resource (e.g. through the cloud provider's website) using their real identity. The customer acquires. compute power units based on cryptographically blinded identities (one unblinded token per unit by way of example) from the compute provider (cloud Provider). The resulting blind signature/identity may be publicly verified against the original, unblinded message in the manner of a regular digital signature. These tokens may have an expiration date, e.g. of between 1 month to 1 year.

Alternatively, in other embodiments anonymous payment systems like ZeroCash over Ethereum (ZoE) might be used.

The customer receives an anonymised access token, which may be for example obtained by un-blinding the received blind-signed tokens and is now in the possession of an untraceable proof of access to computing power at that cloud provider. At this point in time the proof of access is not bound to any particular computer node or service.

In case of an anonymous payment system, a pseudonymous identity created by the customer may be tied to the monetary transaction of the anonymous currency via subject/comment fields or similar measures. In such an embodiment the anonymized access token may be the sum of at least the payment or a reference to it and a cryptographic pseudo-identity of the customer that will be used for provisioning the cloud node.

In another embodiment of an anonymous payment system, the cryptographic identities as used in the anonymous payment system may be reused to prove ownership of the node to the secure chip enclave by referring to the anonymous payment for the specific operation. In such a case the anonymized access token may consist of a reference to a cryptographic identity (public key reference, common reference string zero-knowledge proofs like the ones used in zk-SNARK) and a payment reference tied together cryptographically (through a public ledger like a blockchain etc.). The customer then connects anonymously to a cloud provider and requests a list of compute nodes, optionally of a required class, that become available within a time (t). That list is preferable sufficiently large (>=100 k node CPU vendor serial numbers by way of example). In case the list is too small it can be filled up with higher class CPU node instances). For sensitive or demanding applications, the customer might request a list of fully exclusive nodes. The delivered list may comprise of node identities, e.g. serial numbers.

The customer then randomly selects one or more nodes (e.g. via node identities such as serial numbers) from that pool and pays for computing time. The customer may also require additional features such as external IP addresses, which can be enabled through exchange of one or more of the previously acquired tokens.

The cloud provider responds with an ownership certificate, preferably time-bound signing an anonymous pseudo-identity public key provided by the customer and optionally providing an IP-address/port combination for contacting the selected node. This time bound certificate by the cloud provider may then be used as a proof of (temporary) ownership of the selected computing node and is verified by the secure chip enclave.

The customer's pseudo-identity may then be used (typically once) for provisioning a single host or a group of hosts. For the time indicated in the temporary ownership certificate the nodes secure chip enclave will honour the temporary identity.

By requesting more computing time from the cloud provider for the temporally owned node, the cloud provider may extend the computation time by creating an extended time-bound certificate.

The customer waits for the start time quoted in the temporary ownership certificate and connects to the untrusted OS on that machine using its temporary ownership certificate for further provisioning.

The customer provides either a bootloader for a virtual machine in the untrusted OS hypervisor on one or more (virtual) cores or—for sensitive applications, the OS may delegate ownership of the secure enclave to the temporary ownership certificate for the given time and then fall back to the previous ownership certificate (certificate stack).

In exclusive ownership embodiments, the anonymous client may now directly communicate through the untrusted cloud provider OS with the secure chip enclave protected by public-key encryption (TLS etc.) and per-message-signatures. The chip identity of the enclave is used to remotely attest the integrity and state of the cloud computing node regarding management interfaces.

The customer encrypts the firmware image with the remote secure enclave public session key for example and signs the firmware image using his own pseudo identity and the current rollback counter of the remote chip with its serial number and an enclave-provided NONCE. The encryption of the firmware image ensures that the cloud provider will be unable to profile customers identities based on specific boot images.

The customer then sends the encrypted and signed provisioning boot-image to the untrusted OS. The untrusted OS places that image verbatim into the shared memory (e.g. SRAM).

As the ownership has already moved to the temporary identity of the remote user, the remote user then issues the secure reboot command into the secure chip enclave and the secure chip enclave reboot halts the main CPUs in response to the secure reboot request.

The secure enclave then verifies the signature and decrypts the provisioned image using its own private key. If the firmware signature corresponds to the currently active user (the time-limited access certificate for the anonymous user in this case), the secure enclave will boot the image securely on the main CPU by resetting and running the main CPU.

In the event the signature is invalid for the currently active user, the system resets the secure enclave and shared (SRAM) memory to cold boot state (wiped memories) and the process starts from the beginning.

If the signature corresponds, the system is now secured, the provisioned image is in the shared memory (e.g. SRAM) with code that runs in highest privilege mode, which then reconfigures the IO-MMU and may boot the untrusted BIOS initialization in a lower security mode. The system may then load further parts of the OS or a hypervisor from public content delivery networks (CDNs) while verifying secure hashes and enforcing a trusted chain of trust.

The secure OS may then boot and generate a per-node key which may then be used in any further communication.

In some embodiments the customer may be willing to extend the computation time on the temporarily owned host, in which they can request further computation time for the temporarily owned host from the cloud provider's backend and receive a further anonymized access token. The customer-provided trusted OS running on the cloud provider's computation node presents this token to the secure chip enclave which will verify the token and in the success case extend the computation time up to the indicated time frame.

It will be appreciated that the secure chip enclave does not initiate such requests nor does it need to have direct access to the network. One advantage of this approach is that the communication of the secure chip enclave may be observed and gated by the customer if needed.

Once the indicated time in the temporary ownership certificate expires, the secure enclave will reboot the system and revert optionally back to obey the identity chain of trust of the cloud provider. In one embodiment it will return to an unprovisioned state and boot the locally provisioned cloud provider OS to await a new customer interaction.

Further techniques may also be used to mix compute loads across nodes of the same group (or selected group):
- The previously provisioned anonymous computing nodes may be provisioned in groups within low latency networks.
- The complexity of fingerprinting of cloud node operations or ownership of individual nodes may be increased based on electromagnetic radiation, heat, noise. Power analysis (SPA) attacks may be prevented via silicon-features and active countermeasures in the task-scheduler or hypervisor.
- To complicate analysis of data gathered by attackers, sensitive computing tasks may be migrated (once or regularly) and/or split between nodes within the anonymously allocated exclusive node groups.

In many cases the workload-data may need to be split or migrated—in some cases the current state of the computation and intermediate results may therefore be migrated as well. By using high-level languages like Java, JavaScript or libraries like OpenMP, breaking down tasks into parts running on multiple cores and machines can be simplified. Traditional computing task can be equally migrated, but might require considerable memory state to be migrated with them.

For some applications, stream-processing might be desirable across a group of hosts. In that scenario, provisioned hosts respond to multiple overlapping streams within a group—a single host might be even involved multiple times within the same stream computation at different hops.

To prevent fingerprinting of activity, hosts may equalize communication patterns by constantly exchanging data independent of communication needs. The communication may be timer-driven—similar to a conveyer-belt operation, but for a constant stream network packets—with the conveyor belt encrypted. Due to the encryption of the communication an attacker is not able to see which packets have genuine payloads and which of them are fake. Ideally fake packets contain the results of fake computations which are run instead of idle cycles on the CPUs used to obfuscate the load profile. Another option might be to run similar computations with random data and mixing these in with normal operations (multithreading, hyper-threading or comparable technologies) in random patterns.

Although a group of computing hosts could communicate using class keys in a VPN-style, that approach is less desirable from a security perspective (flat security model). Instead the owner of the anonymous computing group may choose a random order of hosts for computing any given task and prepare predetermined slices of data and code in their computing order.

The individual computation tasks may be encrypted step-by step in an onion-routing approach (nested encryption of multiple sequential payloads, decrypting layer-by-layer at each hop using node-specific keys).

Processing results, which are needed in later steps, may be encrypted with a per-computing-target session key. Each session-key will be encrypted with the public per-node-key of the corresponding target.

Results that are irrelevant to subsequent computation will be encrypted with the session key, too—and the session key encrypted using a public key. Although intermediate results might be sent directly back to the requestor this approach should be avoided to prevent fingerprinting of operations.

Task communication may be padded to allow space for computation results. This prevents attackers from inferring whether a particular hop was involved in computations of the data forwarded or is irrelevant and was just holding back the data for a random time.

It will be clear to one skilled in the art that many improvements and modifications can be made to the foregoing example embodiments without departing from the scope of the present disclosure.

Embodiments may comprise providing a cryptographically blinded token to the provider of the compute nodes, signing the cryptographically blinded token responsive to verification of access to the plurality of compute nodes by the requestor, wherein the anonymised access token comprises the signed cryptographically blinded token.

In embodiments the verification may comprises confirming access to the plurality of compute nodes has been authorised.

In embodiments the authorising may comprise authorising access to a subset of the plurality of compute nodes.

In embodiments the selecting at least one compute node may comprise randomly selecting the at least one compute node.

In embodiments the selecting at least one compute node may comprise selecting at least one compute node with available for exclusive use by the requestor.

In embodiments the provisioning the compute node may comprise provisioning for a finite time period.

In embodiments the provisioning for a finite time period may be extended by creating an extended time-bound certificate.

In embodiments provisioning for a finite time period may be further extended by creating a second extended time-bound certificate.

Some embodiments may further comprise rebooting or resetting the compute node responsive to exceeding the finite time period. The rebooting or resetting may be initiated by the secure enclave; the rebooting or resetting may comprise setting the compute node to an unprovisioned state.

Accordingly, some aspects and features of the disclosed embodiments are set out in the following numbered items:

1. A method of provisioning a compute node in a plurality of compute nodes to a requestor, the method comprising: receiving an anonymised access token from a provider of the compute nodes; requesting identities of a subset of compute nodes in the plurality of compute nodes; selecting at least one compute node in the subset of compute nodes; providing the anonymised access token to a secure enclave of the selected at least one compute node; providing an anonymised identity of the requestor to the secure enclave; and validating use of the anonymised identity with the access token to provision the compute node to the requestor.

2. A method as stated in item 1, further comprising: providing a cryptographically blinded token to the provider of the compute nodes, signing the cryptographically blinded token responsive to verification of access to the plurality of compute nodes by the requestor, wherein the anonymised access token comprises the signed cryptographically blinded token.

3. A method as stated in item 2, wherein the verification comprises confirming access to the plurality of compute nodes has been authorised.

4. A method as stated in item 3, wherein the authorising comprises authorising access to a subset of the plurality of compute nodes.

5. A method as stated in any preceding items wherein the selecting at least one compute node comprises randomly selecting the at least one compute node.

6. A method as stated in any preceding items wherein the selecting at least one compute node comprises selecting at least one compute node with available for exclusive use by the requestor.

7. A method as stated in any preceding items wherein the provisioning the compute node comprises provisioning for a finite time period.

8. A method as stated in item 7, wherein the provisioning for a finite time period is extended by creating an extended time-bound certificate.

9. A method as stated in item 8, wherein the wherein the provisioning for a finite time period is further extended by creating a second extended time-bound certificate.

10. A method as stated in item 7, further comprising rebooting or resetting the compute node responsive to exceeding the finite time period.

11. A method as stated in item 10, wherein the rebooting or resetting is initiated by the secure enclave.

12. A method as stated in items 10 or 11, wherein the rebooting or resetting comprising setting the compute node to an unprovisioned state.

13. Apparatus for accessing compute resource on a plurality of compute nodes, wherein the apparatus comprises a processing element configured to: receive an anonymised access token from a provider of the compute nodes; request identities of a subset of compute nodes in the plurality of compute nodes to provide the compute resource; select at least one compute node in the subset of compute nodes; provide the anonymised access token to a secure enclave of the selected at least one compute node; provide an anonymised identity of the requestor to the secure enclave; and responsive to validation of the anonymised identity with the access token, access compute resource on the selected at least one compute node.

14. A computing system comprising: a compute node to execute remotely-provided software; a secure enclave comprising a cryptographic identity and to control the execution of trusted or untrusted software by the compute node by selectively resetting the compute node; and an enclave memory accessible by the compute node and the secure enclave to store remotely-provided software for execution by the compute node, wherein the secure enclave is to verify a remotely-provided boot image for execution by the compute node using public-key signature verification and wherein the secure enclave is configured, in the event of a successful verification of the boot image, to enable the compute node to boot using the verified boot image and execute for a period defined by a time-bound certificate, and wherein the secure enclave is to revert control of the compute node once a tenancy period of the compute node expires by resetting the compute node.

15. The system of item 14, wherein the secure enclave is formed of one of: a dedicated privilege level of the compute node higher than user-provisioned code; or a processing node separate to the compute node.

16. The system of item 14, wherein the system is configured to verify the boot image by: receiving a boot image encrypted using a public key of the secure enclave; storing, in the enclave memory, the encrypted boot image in encrypted form; verifying, at the secure enclave, a signature associated with the encrypted boot image; and decrypting, in the event of a successful signature verification, the boot image using a private key of the secure enclave; and booting, under the control of the secure enclave, the decrypted boot image on the compute node.

17. The system of item 14, wherein the system is to, in the event of an unsuccessful signature verification, reset the compute node and to clear at least a portion of the contents of the enclave memory.

18. The system of item 16, wherein the system is configured, subsequent to the boot of the decrypted boot image on the compute node, to boot a trusted operating system and wherein the secure enclave is configured to issue one or more challenges to the trusted operating system for a secure time update through the trusted operating system.

19. The system of item 14, wherein the system is to, in the event of a successful signature verification, boot using the decrypted firmware image an untrusted BIOS initialization for the compute node in a low security mode and to re-configure an input-output memory management unit.

20. The system of item 14, wherein the secure enclave is configured to extend the period during which the verified boot is to execute on the compute node in response to receiving an extended time-bound certificate.

21. The system of item 14, wherein at least one of the secure enclave and the compute node is to temporarily give up read or write access to one or more memory blocks in the enclave memory.

22. The system of item 21, wherein an access state of each memory block can be inspected by both the secure enclave and the compute node.

23. The system of item 14, further comprising a tamper detector to detect tamper signals of at least one of the secure enclave, the compute node, one or more on-chip peripherals, and one or more off-chip components, and wherein the system is configured to delete at least a portion of the content of the enclave memory is response to the detection of a tamper signal.

24. The system of item 14, further comprising one or more additional compute nodes and wherein the secure enclave is configured to individually control the execution of trusted or untrusted software on each compute node.

25. A method of operating a computing system comprising: executing, using a compute node, remotely-provided software; controlling, using a secure enclave comprising a cryptographic identity, the execution of trusted or untrusted software by the compute node by selectively resetting the compute node; and storing, in an enclave memory accessible by the compute node and the secure enclave, remotely-provided software for execution by the compute node; verifying, at the secure enclave, a remotely-provided boot image for execution by the compute node using public-key signature verification and, in the event of a successful verification of the boot image, enabling the compute node to boot using the verified boot image and execute for a period defined by a time-bound certificate; and reverting, at the secure enclave, control of the compute node once a tenancy period of the compute node expires by resetting the compute node.

26. The method of item 25, wherein the secure enclave is formed of one of: a dedicated privilege level of the compute node higher than user-provisioned code; or a processing node separate to the compute node.

27. The method of item 25, wherein verifying the boot image comprises: receiving a boot image encrypted using a public key of the secure enclave; storing, in the enclave memory, the encrypted boot image in encrypted form; verifying, at the secure enclave, a signature associated with the encrypted boot image; and decrypting, in the event of a successful signature verification, the boot image using a private key of the secure enclave; and booting, under the control of the secure enclave, the decrypted boot image on the compute node.

28. The method of item 25, further comprising, in the event of an unsuccessful signature verification, resetting the compute node and clearing at least a portion of the contents of the enclave memory.

29. The method of item 28, further comprising, subsequent to the boot of the decrypted boot image on the compute node, booting a trusted operating system and issuing, by the secure enclave, one or more challenges to a trusted operating system for a secure time update through the trusted operating system.

30. The method of item 25, further comprising extending, by the secure enclave, the period during which the verified boot is to execute on the compute node in response to receiving an extended time-bound certificate.

31. The method of item 25, further comprising one or more additional compute nodes and wherein the secure enclave is configured to individually control the execution of trusted or untrusted software by each compute node.

32. The method of item 25, wherein at least one of the secure enclave and the compute node is to temporarily give up read or write access to one or more memory blocks in the enclave memory.

33. The method of item 32, wherein an access state of each memory block can be inspected by both the secure enclave and the compute node.

The invention claimed is:

1. A computing system comprising:
   a compute node to execute remotely-provided software;
   a secure enclave comprising a cryptographic identity and to control the execution of trusted or untrusted software by the compute node by selectively resetting the compute node; and
   an enclave memory accessible by the compute node and the secure enclave to store remotely-provided software for execution by the compute node,
   wherein the secure enclave is to verify a remotely-provided boot image for execution by the compute node using public-key signature verification and wherein the secure enclave is configured, in the event of a successful verification of the boot image, to enable the compute node to boot using the verified boot image and execute for a period defined by a time-bound certificate, and
   wherein the secure enclave is to revert control of the compute node once a tenancy period of the compute node expires by resetting the compute node.

2. The system of claim 1, wherein the secure enclave is formed of one of:
   a dedicated privilege level of the compute node higher than user-provisioned code; or
   a processing node separate to the compute node.

3. The system of claim 1, wherein the system is configured to verify the boot image by:
   receiving a boot image encrypted using a public key of the secure enclave;
   storing, in the enclave memory, the encrypted boot image in encrypted form;
   verifying, at the secure enclave, a signature associated with the encrypted boot image; and
   decrypting, in the event of a successful signature verification, the boot image using a private key of the secure enclave; and
   booting, under the control of the secure enclave, the decrypted boot image on the compute node.

4. The system of claim 1, wherein the system is to, in the event of an unsuccessful signature verification, reset the compute node and to clear at least a portion of the contents of the enclave memory.

5. The system of claim 3, wherein the system is configured, subsequent to the boot of the decrypted boot image on the compute node, to boot a trusted operating system and wherein the secure enclave is configured to issue one or more challenges to the trusted operating system for a secure time update through the trusted operating system.

6. The system of claim 1, wherein the system is to, in the event of a successful signature verification, boot an untrusted BIOS initialization in a lower security mode and re-configure an input-output memory management unit.

7. The system of claim 1, wherein the secure enclave is configured to extend the period during which the verified boot is to execute on the compute node in response to receiving an extended time-bound certificate.

8. The system of claim 1, wherein at least one of the secure enclave and the compute node is to temporarily give up read or write access to one or more memory blocks in the enclave memory.

9. The system of claim 8, wherein an access state of each memory block can be inspected by both the secure enclave and the compute node.

10. The system of claim 1, further comprising a tamper detector to detect tamper signals of at least one of the secure enclave, the compute node, one or more on-chip peripherals, and one or more off-chip components, and wherein the system is configured to delete at least a portion of the content of the enclave memory is response to the detection of a tamper signal.

11. The system of claim 1, further comprising one or more additional compute nodes and wherein the secure enclave is configured to individually control the execution of trusted or untrusted software on each compute node.

12. A method of operating a computing system comprising:
    executing, using a compute node, remotely-provided software;
    controlling, using a secure enclave comprising a cryptographic identity, the execution of trusted or untrusted software by the compute node by selectively resetting the compute node; and
    storing, in an enclave memory accessible by the compute node and the secure enclave, remotely-provided software for execution by the compute node;
    verifying, at the secure enclave, a remotely-provided boot image for execution by the compute node using public-key signature verification and, in the event of a successful verification of the boot image, enabling the compute node to boot using the verified boot image and execute for a period defined by a time-bound certificate; and
    reverting, at the secure enclave, control of the compute node once a tenancy period of the compute node expires by resetting the compute node.

13. The method of claim 12, wherein the secure enclave is formed of one of:
    a dedicated privilege level of the compute node higher than user-provisioned code; or
    a processing node separate to the compute node.

14. The method of claim 12, wherein verifying the boot image comprises:
    receiving a boot image encrypted using a public key of the secure enclave;
    storing, in the enclave memory, the encrypted boot image in encrypted form;
    verifying, at the secure enclave, a signature associated with the encrypted boot image; and
    decrypting, in the event of a successful signature verification, the boot image using a private key of the secure enclave; and
    booting, under the control of the secure enclave, the decrypted boot image on the compute node.

15. The method of claim 12, further comprising, in the event of an unsuccessful signature verification, resetting the compute node and clearing at least a portion of the contents of the enclave memory.

16. The method of claim 15, further comprising, subsequent to the boot of the decrypted boot image on the compute node, booting a trusted operating system and issuing, by the secure enclave, one or more challenges to a trusted operating system for a secure time update through the trusted operating system.

17. The method of claim 12, further comprising extending, by the secure enclave, the period during which the verified boot is to execute on the compute node in response to receiving an extended time-bound certificate.

18. The method of claim 12, further comprising one or more additional compute nodes and wherein the secure enclave is configured to individually control the execution of trusted or untrusted software by each compute node.

19. The method of claim 12, wherein at least one of the secure enclave and the compute node is to temporarily give up read or write access to one or more memory blocks in the enclave memory.

20. The method of claim 19, wherein an access state of each memory block can be inspected by both the secure enclave and the compute node.

\* \* \* \* \*